US012646058B2

(12) United States Patent
Maitra et al.

(10) Patent No.: US 12,646,058 B2
(45) Date of Patent: Jun. 2, 2026

(54) SYSTEM AND METHOD FOR EFFICIENTLY MANAGING CALLOUTS

(71) Applicant: Visa International Service Association, San Francisco, CA (US)

(72) Inventors: Rajib Maitra, San Ramon, CA (US); Nisha Jain, San Francisco, CA (US); Bireswar Banerjee, Austin, TX (US); Israel Zaragoza Cabello, San Francisco, CA (US); Anshu Taneja, San Francisco, CA (US); Justin Ma, San Francisco, CA (US); Livia Noguera, San Francisco, CA (US); Daniel David Childs, San Francisco, CA (US); Lawrence Finnerty, Highlands Ranch, CO (US); Adalberto Gonzalez, Jr., San Francisco, CA (US); Kingson Poon, San Francisco, CA (US); Bishenjit Paul Choudhury, Austin, TX (US); Alexandria Mathew, Austin, TX (US); Sujoy Sen, San Francisco, CA (US); Hongyuan Lin, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 82 days.

(21) Appl. No.: 18/693,136

(22) PCT Filed: Sep. 12, 2022

(86) PCT No.: PCT/US2022/043190

§ 371 (c)(1),
(2) Date: Mar. 18, 2024

(87) PCT Pub. No.: WO2023/055552

PCT Pub. Date: Apr. 6, 2023

(65) Prior Publication Data

US 2024/0386423 A1       Nov. 21, 2024

Related U.S. Application Data

(60) Provisional application No. 63/250,877, filed on Sep. 30, 2021.

(51) Int. Cl.
*G06Q 20/38* (2012.01)

(52) U.S. Cl.
CPC ....... *G06Q 20/3829* (2013.01); *G06Q 20/389* (2013.01); *G06Q 2220/00* (2013.01)

(58) Field of Classification Search
None
See application file for complete search history.

(56) References Cited

U.S. PATENT DOCUMENTS 9,244,730 B2      1/2016  Lai et al.
10,740,474 B1 *   8/2020  Ghetti ................... H04L 9/3066
(Continued)

FOREIGN PATENT DOCUMENTS

WO       WO-2021127652 A1 *  6/2021  ........... H04L 9/3213

OTHER PUBLICATIONS

Darius Ghassemian, "Ultimate Guide to Processing Batch Payments", Jun. 28, 2021 (Year: 2021).*
(Continued)

*Primary Examiner* — Patrick McAtee
*Assistant Examiner* — Timothy Paul Sax
(74) *Attorney, Agent, or Firm* — Kilpatrick Townsend & Stockton LLP

(57) ABSTRACT

A method of using a processing computer comprising a memory comprising a hash index table and an array index table is disclosed. The method includes receiving an initial
(Continued)

request message comprising a plurality of data fields with data elements for a transaction, and creating service request messages, where each service request message comprises a transaction key and data elements. The method includes transmitting the service request messages to server computers, which process them and generate service response messages, each service response message having the transaction key and response data. The method includes receiving the service response messages. The method includes for each of the service response messages: accessing the hash index table and determining a row address identifier for a row in the array index table based on the transaction key, and accessing data in the row of the array index table associated with the row address identifier.

20 Claims, 7 Drawing Sheets

(56) References Cited

U.S. PATENT DOCUMENTS

| | | | |
|---|---|---|---|
| 10,803,459 | B2 | 10/2020 | Hays et al. |
| 11,341,113 | B1* | 5/2022 | Lakshminarasimhan .................... G06F 16/2343 |
| 2015/0186889 | A1 | 7/2015 | Hogg et al. |
| 2016/0277380 | A1 | 9/2016 | Wagner et al. |
| 2017/0126627 | A1* | 5/2017 | Yang ........................ H04L 63/20 |
| 2018/0167492 | A1* | 6/2018 | Bonig .................. G06Q 20/085 |
| 2020/0143375 | A1 | 5/2020 | Gurunathan et al. |
| 2021/0406344 | A1 | 12/2021 | Roberts |
| 2021/0409337 | A1* | 12/2021 | Hu ........................ H04L 47/2483 |
| 2023/0004576 | A1* | 1/2023 | Huan .................. G06F 16/2379 |

OTHER PUBLICATIONS

PCT/US2022/043190 , "International Search Report and Written Opinion", Dec. 13, 2022, 13 pages.

* cited by examiner

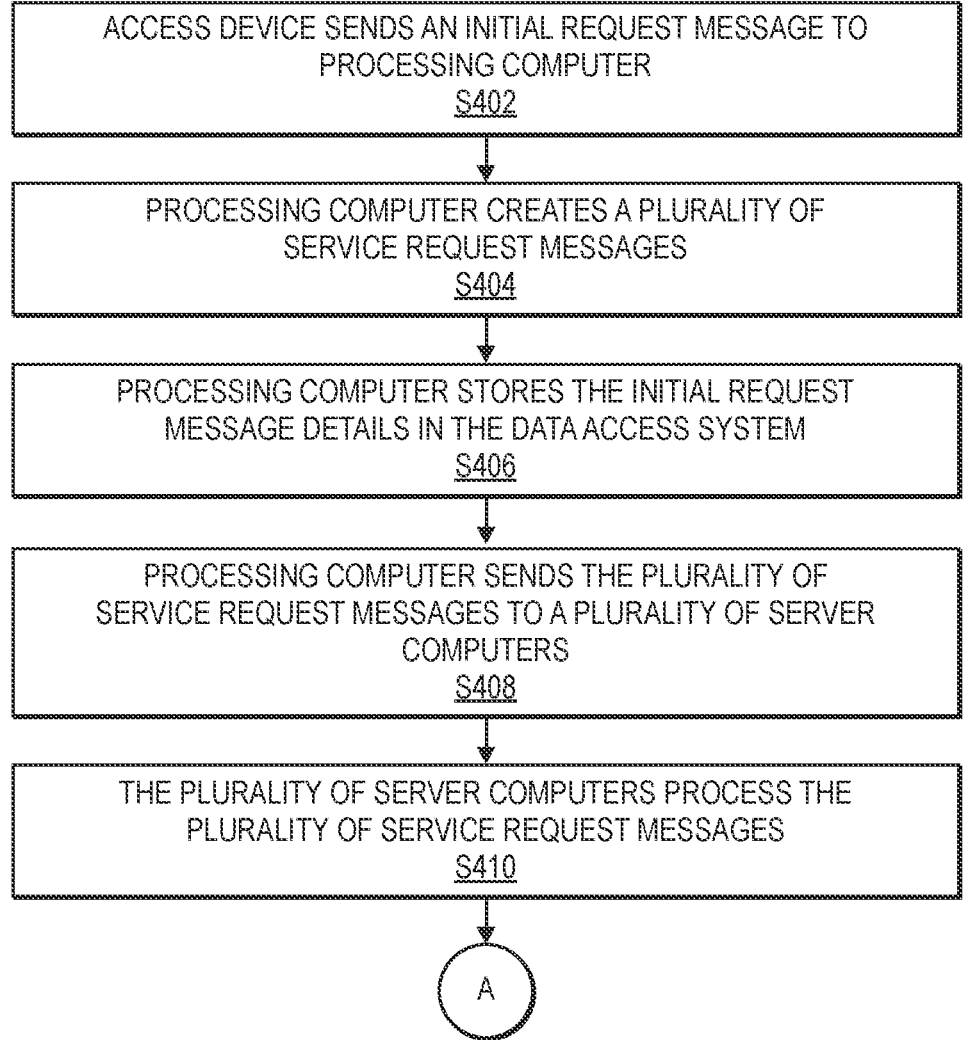

ACCESS DEVICE SENDS AN INITIAL REQUEST MESSAGE TO
PROCESSING COMPUTER
S402

PROCESSING COMPUTER CREATES A PLURALITY OF
SERVICE REQUEST MESSAGES
S404

PROCESSING COMPUTER STORES THE INITIAL REQUEST
MESSAGE DETAILS IN THE DATA ACCESS SYSTEM
S406

PROCESSING COMPUTER SENDS THE PLURALITY OF
SERVICE REQUEST MESSAGES TO A PLURALITY OF SERVER
COMPUTERS
S408

THE PLURALITY OF SERVER COMPUTERS PROCESS THE
PLURALITY OF SERVICE REQUEST MESSAGES
S410

SYSTEM AND METHOD FOR EFFICIENTLY MANAGING CALLOUTS

CROSS-REFERENCE TO RELATED APPLICATIONS

This application is a National Stage of International Application No. PCT/US2022/043190, filed on Sep. 12, 2022, which claims priority to U.S. Provisional Patent No. 63/250,877, filed on Sep. 30, 2021, the entirety of which is are incorporated by reference herein.

BACKGROUND

A conventional processing computer may send a several service requests (e.g., de-tokenization request, payment alert request, etc.) to different server computers to process data in a single request message. For example, the processing computer may receive an authorization request message to request authorization for a particular action. The authorization request message can have at least a token, a value, and a timestamp. Three different specialized server computers in communication with the processing computer can perform different processes on the authorization request message and the data therein. Once the processing is performed by the three specialized server computers, the processing computer can forward the authorization request message to a downstream authorizing entity computer for authorization. For example, a first server computer can detokenize the token to obtain a real credential which can be evaluated by a downstream authorizing entity computer. A second server computer can analyze the authorization request message to determine if it has been tampered with (e.g., by a man-in-the-middle). The third server computer can evaluate the data elements in the authorization request message to determine if they are in the right format for the downstream authorizing entity computer.

The processing of the authorization request message can occur sequentially in conventional processes. For example, the processing computer transmits a service request message to the second computer after it receives a service response message from the first server computer, and transmits a service request message to the third server computer after it receives a service response message from the second server computer. This type of serial processing method can be slow and cumbersome.

Embodiments of the disclosure address this problem and other problems individually and collectively.

BRIEF SUMMARY

One embodiment of the invention includes a method using a processing computer comprising a memory comprising a hash index table and an array index table, the method comprising: receiving, by the processing computer, an initial request message comprising a plurality of data fields with data elements for a transaction; creating, by the processing computer, a plurality of service request messages associated with the initial request message, wherein each service request message comprises a transaction key and at least one data element of the data elements; transmitting, by the processing computer, the plurality of service request messages to a plurality of server computers, wherein the plurality of server computers process the data elements in the respective plurality of service request messages, and generate a plurality of service response messages, each service response message comprising the transaction key and response data; receiving, by the processing computer, the plurality of service response messages from the plurality of server computers; and for each of the plurality of service response messages: accessing, by the processing computer, the hash index table and determining a row address identifier for a row in the array index table based on the transaction key; and accessing, by the processing computer, data in the row of the array index table associated with the row address identifier and performing further processing using the data in the row in the array index table.

Another embodiment includes a processing computer comprising: a processor; a memory comprising a hash index table and an array index table; and a computer readable medium coupled to the process, the computer readable medium comprising code executable by the processor for performing operations comprising: receiving an initial request message comprising a plurality of data fields with data elements for a transaction; creating a plurality of service request messages associated with the initial request message, wherein each service request message comprises a transaction key and at least one data element of the data elements; transmitting the plurality of service request messages to a plurality of server computers, wherein the plurality of server computers process the data elements in the respective plurality of service request messages, and generate a plurality of service response messages, each service response message comprising the transaction key and response data; receiving the plurality of service response messages from the plurality of server computers; and for each of the plurality of service response messages: accessing the hash index table and determining a row address identifier for a row in the array index table based on the transaction key; and accessing data in the row of the array index table associated with the row address identifier and performing further processing using the data in the row in the array index table.

These and other embodiments are described in further detail below.

BRIEF DESCRIPTION OF THE DRAWINGS

FIGS. 4A and 4B show a flowchart illustrating steps in a non-serial call-out scheme according to embodiments.

DETAILED DESCRIPTION

Figure 1:
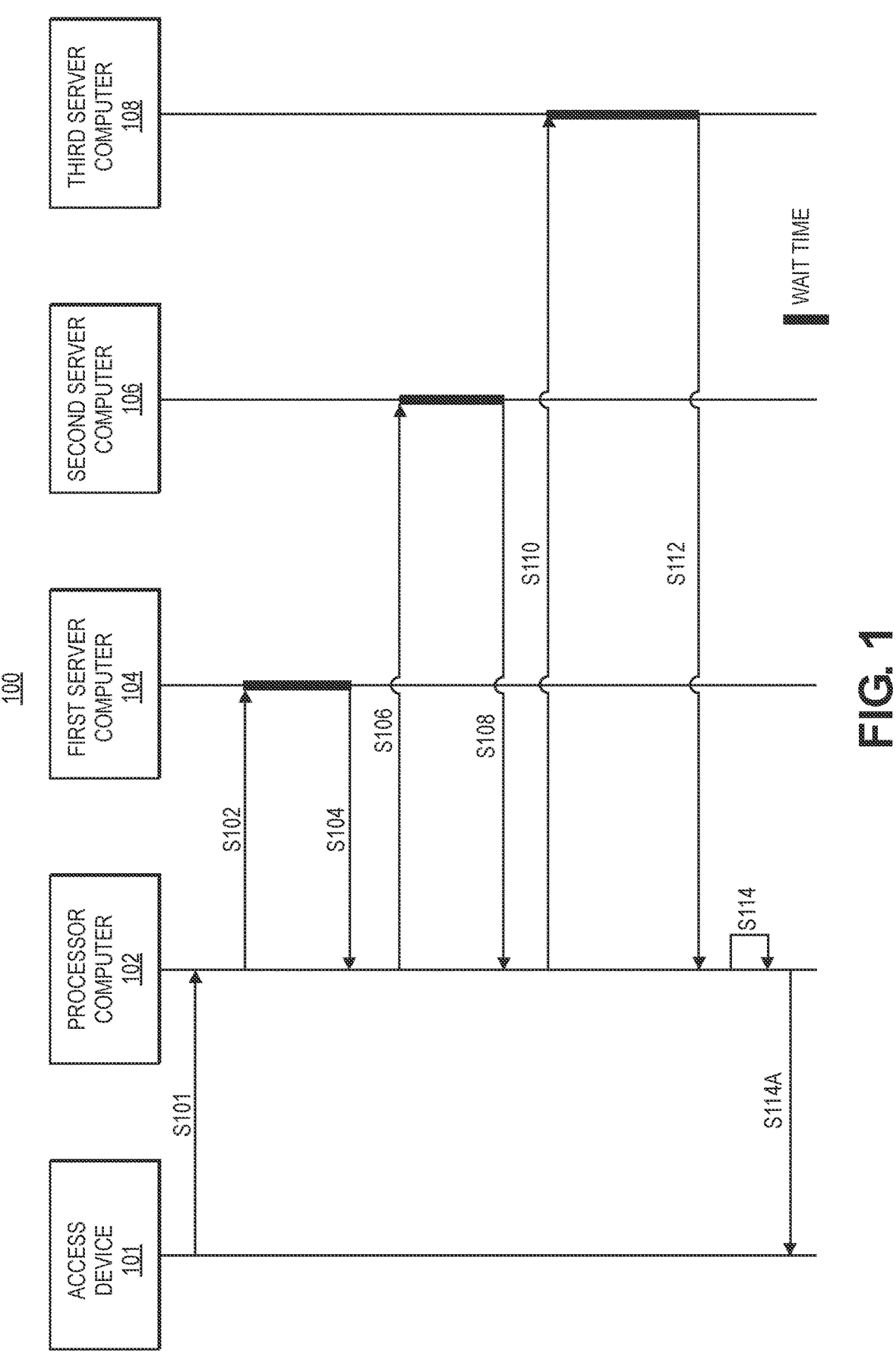
FIG. 1 shows a system and a flow diagram illustrating a serial call-out scheme.

Before discussing embodiments of the invention, the descriptions of some terms may be helpful.

A "user" may include an individual or a computational device. In some embodiments, a user may be associated with one or more personal accounts and/or mobile devices. In some embodiments, the user may be a cardholder, account holder, or consumer.

A "user device" may be any suitable device that can interact with a user device (e.g., a payment card or mobile phone). User devices may be in any suitable form. Some examples of user devices include cellular phones, PDAs, personal computers (PCs), tablet computers, and the like. In some embodiments, where a user device is a mobile device, the mobile device may include a display, a memory, a processor, a computer-readable medium, and any other suitable component.

A "resource provider" can be any suitable entity that provides resources (e.g., goods, services, access to secure data, access to locations, or the like) during a transaction. For example, a resource providing entity can be a merchant, a venue operator, a building owner, a governmental entity, etc. A "merchant" may typically be an entity that engages in transactions and can sell goods or services, or provide access to goods or services.

An "application" may be a computer program that is used for a specific purpose.

"Authentication data" may include any data suitable for authenticating a user or mobile device. Authentication data may be obtained from a user or a device that is operated by the user. Examples of authentication data obtained from a user may include PINs (personal identification numbers), biometric data, passwords, etc. Examples of authentication data that may be obtained from a device may be include device serial numbers, hardware secure element identifiers, device fingerprints, phone numbers, IMEI numbers, etc.

"Access data" may include any suitable data that can be used to access a resource or create data that can access a resource. In some embodiments, access data may be account information for a payment account. Account information may include a PAN (primary account number), payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. In other embodiments, access data could include data that can be used to access a location. Such access data may be ticket information for an event, data to access a building, transit ticket information, etc. In yet other embodiments, access data may include data used to obtain access to sensitive data. Examples of access data may include codes or other data that are needed by a server computer to grant access to the sensitive data.

An "access request" may include a request for access to a resource. The resource may be a physical resource (e.g., good), digital resources (e.g., electronic document, electronic data, etc.), or services. In some cases, an access request may be submitted by transmission of an access request message that includes access request data. Typically a device associated with a requestor may transmit the access request message to a device associated with a resource provider.

"Access request data" may include any information surrounding or related to an access request. Access request data may include access data. Access request data may include information useful for processing and/or verifying the access request. For example, access request data may include details associated with entities (e.g., resource provider computer, processor server computer, authorization computer, etc.) involved in processing the access request, such as entity identifiers (e.g., name, etc.), location information associated with the entities, and information indicating the type of entity (e.g., category code). Exemplary access request data may include information indicating an access request amount, an access request location, resources received (e.g., products, documents, etc.), information about the resources received (e.g., size, amount, type, etc.), resource providing entity data (e.g., resource provider data, document owner data, etc.), user data, date and time of an access request, a method utilized for conducting the access request (e.g., contact, contactless, etc.), and other relevant information. Access request data may also be known as access request information, transaction data, transaction information, or the like.

An "access device" may be any suitable device for providing access to an external computer system. An access device may be in any suitable form. Some examples of access devices include point of sale (POS) devices, cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, Websites, and the like. An access device may use any suitable contact or contactless mode of operation to send or receive data from, or associated with, a mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a mobile device.

A "credential" may be any suitable information that serves as reliable evidence of worth, ownership, identity, or authority. A credential may be a string of numbers, letters, or any other suitable characters, as well as any object or document that can serve as confirmation. Examples of credentials include value credentials, identification cards, certified documents, access cards, passcodes and other login information, etc. Other examples of credentials include PANs (primary account numbers), PII (personal identifiable information) such as name, address, and phone number, and the like.

An "authorizing entity" may be an entity that authorizes a request, typically using an authorizing computer to do so. An authorizing entity may be an issuer, a governmental agency, a document repository, an access administrator, etc. An "issuer" may typically include a business entity (e.g., a bank) that maintains an account for a user. An issuer may also issue payment credentials stored on a user device, such as a cellular telephone, smart card, tablet, or laptop to the user.

A "service provider" may be an entity that can provide a resource such as goods, services, information, and/or access typically through a service provider computer. Examples of a service provider includes merchants, digital wallets, payment processors, etc.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "authorization request message" may be an electronic message that is sent to a payment processing network and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CW (card verification value), a dCW (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may be an electronic message reply to an authorization request message generated by an issuing financial institution or a payment processing network. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization. As noted above, in some embodiments, a payment processing network may generate or forward the authorization response message to the merchant.

A "server computer" is typically a powerful computer or cluster of computers. For example, the server computer can be a large mainframe, a minicomputer cluster, or a group of servers functioning as a unit. In one example, the server computer may be a database server coupled to a Web server.

A "processor" may include any suitable data computation device or devices. A processor may comprise one or more microprocessors working together to accomplish a desired function. The processor may include CPU comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

When the processing computer transmits the plurality of service request messages to the plurality of server computers in prior systems, the processing computer can transmit each service request message among the plurality of service request messages to a corresponding server computer in a sequential manner. In other words, the processing computer needs to wait to receive a service response message of one service request message before it can transmit another service request message.

FIG. 1 shows a system and a flow diagram illustrating a serial call-out scheme. FIG. 1 shows an access device 101, a processing computer 102, a first server computer 104, a second server computer 106, and a third server computer 108. The access device 101 may be in operative communication with the processing computer 102. In some instances, the access device and the processing computer can communicate with a transport computer (not shown) such as an acquirer computer. The processing computer 102 can be in communication with the first server computer 104, the second server computer 106 and the third server computer 108. In some embodiments, the first server computer, the second server computer 106, and the third server computer 108 may perform different operations on an initial request message or the data therein, and may be operated by the same or different entities (e.g., organizations). For example, the first server computer 104 can perform de-tokenization processing, the second server computer 106 can perform fraud processing, and the third server computer 108 can perform transaction alert processing.

Each of the entities in FIG. 1 may communicate through any suitable communication channel or communications network. A suitable communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

In step S101, an access device 101 can send an initial request message to the processing computer 102 to process a transaction. The initial request message can comprise a plurality of data fields with data elements for the transaction. The data elements can include a name, a token, a CVV, an expiration date, etc.

In step S102, the processing computer 102 can create a first service request message associated with the initial request message. The first service request message can comprise at least one data element of the initial request message. For example, the first service request message can be a de-tokenization request message. The processing computer 102 can send the first service request message to the first server computer 104.

In step S104, the first server computer 104 can process the data elements of the first service request message. The first server computer 104 can then generate a first service response message. The first service response message can comprise response data to the first service request message.

For example, if the first service request message is the detokenization request message comprising a token, the first server computer 104 can obtain a primary account number associated with the token in its database. The first server computer 104 can then generate a first service response message comprising the primary account number (i.e., response data). The first server computer 104 can then send the first service response message back to the processing computer 102. The time that took to send the first service request message, process it, and return the first service response message can be a first wait time period.

In step S106, after receiving the first service response message, the processing computer 102 can create a second service request message associated with the initial request message. The second service request message can comprise at least one data element of the initial request message. For example, the second service request message can be a fraud alert request message. The fraud alert request message can comprise data elements of the initial request message such as a merchant identifier, a timestamp, and a value (e.g., an amount). The processing computer 102 can send the second service request message to the second server computer 106.

In step S108, the second server computer 106 can process the data elements of the second service request message. The second server computer 106 can then generate a second service response message. The second service response message can comprise response data to the second service request message. For example, if the second service request message is the fraud alert request message, the first server computer 104 can analyze the data elements in the initial request message for fraud and determine a fraud score. The first server computer 104 can then generate a fraud alert response message comprising the fraud score (i.e., response data). The second server computer 106 can then send the second service response message back to the processing computer 102. The time that took to send the second service request message, process it, and return the second service response message can be a second wait time period.

In step S110, the processing computer 102 can create a third service request message associated with the initial request message after receiving the second service response message. The third service request message can comprise at least one data element of the initial request message. For example, the third service request message can include a token and an expiration date. The processing computer 102 can transmit the third service request message to the third server computer 108.

In step S112, the third server computer 108 can process the data elements in the third service request message. The third server computer 108 can then generate a third service response message. The third service response message can comprise response data to the third service request message. For example, the third server computer 108 can be an alert server computer, which may look up a phone number of a user associated with the initial request message using the token and the expiration date. The response data may include information indicting that an alert was successfully sent to the user and the user successfully responded to the alert message. The third server computer 108 can then send the third service response message back to the processing computer 102. The time that took to send the third service request message, process it, and return the third service response message can be a third wait time period.

In step S114, after receiving the first, second, and third response messages from the first server computer 104, the second server computer 106, and the third server computer 108, the processing computer 102 can build a subsequent message in the response messages or after analyzing the response data in the response messages. The subsequent message could be a reply message such as an authorization response message and is sent back to the access device 101 (see step S114A. The subsequent message could alternatively be a modified request message, which could be forwarded to another computer such as an authorizing entity computer (e.g., an issuer computer) for further processing (e.g., authorization).

The time period from the time starting from the receipt of the initial request message to the sending of the subsequent message can include at least the first wait time period, the second wait time period, and the third wait time period. This method of processing the initial request message can be inefficient, as the processing computer 102 needs to wait to receive a service response message of one service request message before it transmits another service request message.

In embodiments of the invention, the processing computer can transmit the plurality of service request messages to the plurality of server computers in a non-serial (e.g., parallel) manner. For example, the processing computer can transmit each of the de-tokenization request, the payment alert request, the fraud analysis request, etc. to a corresponding server computer at the same time. The plurality of server computers can then process the plurality of service request messages and generate a plurality of service response messages. The processing computer can then receive the plurality of service response messages from the plurality of server computers, and build a subsequent message (e.g., authorization request message).

In order to process an initial request message comprising a plurality of data fields with data elements for a transaction from an access device (e.g., mobile phone), the processing computer may need to create a plurality of service request messages associated with the initial request message and transmit the plurality of service request messages to a plurality of server computers server computers to process the plurality of service request messages. For example, when a user wants to process a transaction, the user can use a user device (i.e., access device) to send an initial request message comprising a plurality of data fields such as card credential, name, etc. to a payment server computer (i.e., processing computer). To process the transaction, the payment server computer may create a plurality of service request messages (e.g., a de-tokenization request, a payment alert request, a fraud analysis request, etc.) and transmit the plurality of service request messages to a plurality of server computers to build a modified request message (e.g., authorization request message).

More specifically, an embodiment includes a method using a processing computer comprising a memory comprising a hash index table and an array index table. The method includes receiving, by the processing computer, an initial request message comprising a plurality of data fields with data elements for a transaction. The initial request message may request permission, approval or access to a particular resource such as secure data, a secure location, or goods and services. The initial request message may include several data elements. For example, the initial request message could be an access request message such as an authorization request message for a payment transaction. The authorization request message may have several data elements including a primary account number or token, a timestamp, an access device identifier, a value (e.g., an amount), a verification value, etc.

Several operations may need to be performed on the initial request message before making a determination as to the initial request message or forwarding the initial request message to an entity (e.g., an authorizing entity) that can make a determination as to the initial request message. Some of these operations may be specialized and the processing computer may not be programmed to perform all of the operations. For example, operations that might be performed on an authorization request message might include verifying that the authorization request message has not been tampered with during transit, sending an alert message with respect to the initial request message, performing a fraud analysis on the initial request message, detokenizing a token to a primary account number, etc.

The processing computer can create a plurality of service request messages associated with the initial request message. Each service request message comprises a transaction key and at least one data element of the data elements. The processing computer then transmits the plurality of service request messages to a plurality of server computers. The plurality of server computers can then process the data elements in the respective plurality of service request messages, and generate a plurality of service response messages, each service response message comprising the transaction key and response data. For example, the plurality of server computers may comprise a fraud check server computer that checks an authorization request message for fraud, a de-tokenization server computer that exchanges tokens for real credentials, and an alert server computer that sends alerts to users associated with the authorization request message. The service request messages that are sent to the server computers can contain the data elements that they need to perform the requested services.

At some point, the processing computer receives the plurality of service response messages from the plurality of server computers at different times or possibly even simultaneously. For each of the plurality of service response messages, the processing computer can access the hash index table and determining a row address identifier for a row in the array index table based on the transaction key. After determining the row address, the processing computer can access data in the row of the array index table associated with the row address identifier and perform further processing using the data in the row in the array index table. Further processing can include deleting data from the row, using a database entry in the row to retrieve or store data in a database, locking a corresponding cell or slot in the hash table when storing the response data, determining if receipt of the service response message is before or after a timeout time, building a subsequent message using the response data of the plurality of service response messages, etc.

Figure 2:
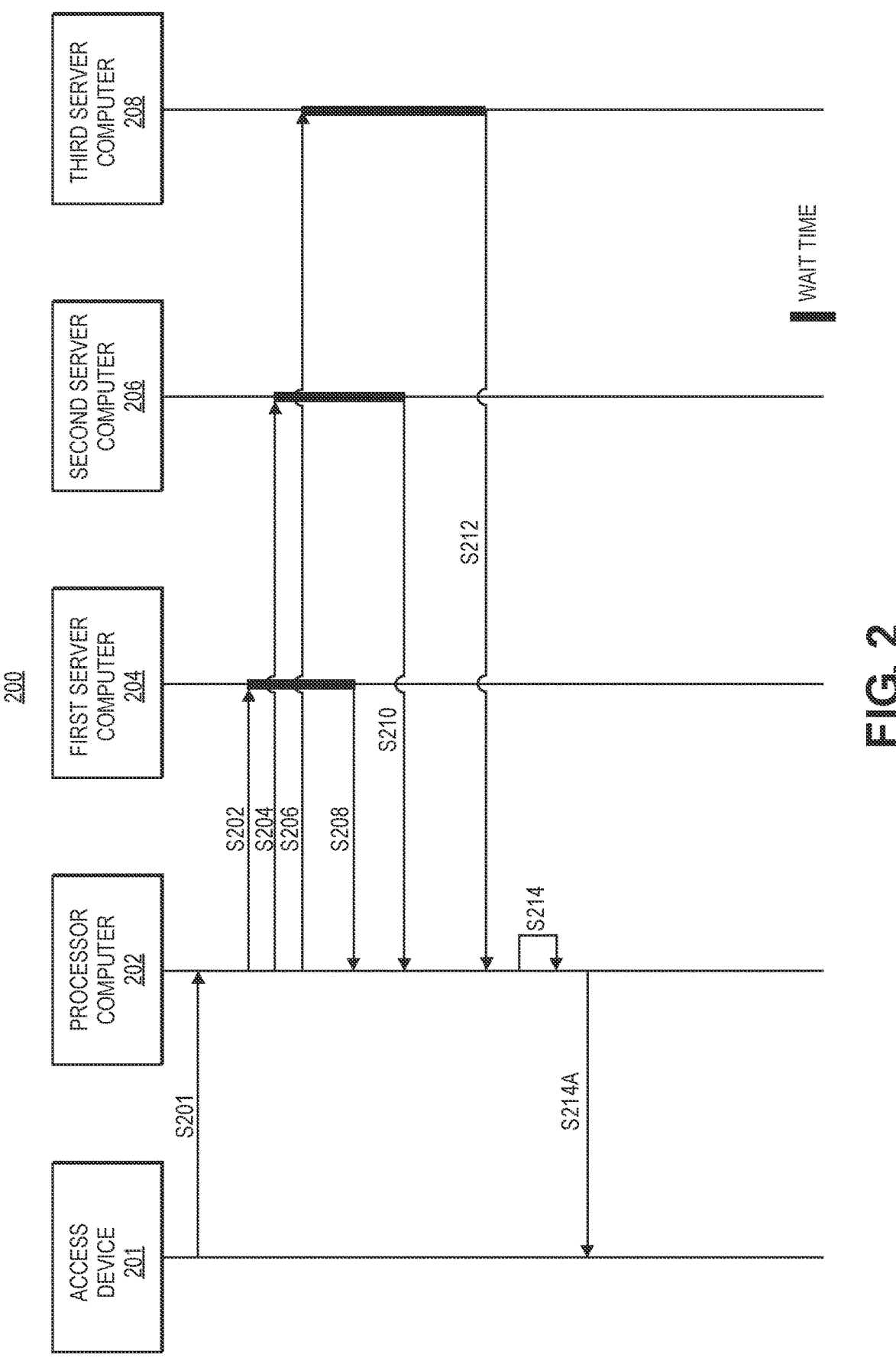
FIG. 2 shows a system and a flow diagram illustrating a non-serial call-out scheme according to embodiments.

FIG. 2 shows a system and a flow diagram illustrating a non-serial (e.g., parallel) call-out scheme. As in FIG. 1, an access device 201, a processing computer 202, a first server computer 204, a second server computer 206, and a third server computer 208 are shown and the descriptions thereof need not be repeated. Each server computer can be programmed to perform different operations on an initial request message or data therein. For example, the first server computer 204 can perform de-tokenization processing, the second server computer 206 can perform fraud processing, and the third server computer 208 can perform transaction alert processing.

In step S201, the access device 201 can send an initial request message to the processing computer 202 to process a transaction. The initial request message can comprise a plurality of data fields with data elements for the transaction. The data elements can include a name, a token, a verification value such as a CVV2, an expiration date, an access device identifier, an expiration date of the account number, a value (e.g., an amount), and other information. The initial request message may have been generated in response to an interaction between a user using a user device (not shown in FIG. 2) and the access device 201. For example, the user device may be a card or a mobile phone and may contain a token stored on it. The access device 201 can be an access terminal such as a POS terminal. The user device can provide the token, verification value, and expiration date to the access device 201, and the access device 201 may generate the initial request message including the information from the user device along with other data (e.g., a timestamp, an access device identifier, etc. from the access device 201.

In steps S202, S204, and S206, the processing computer 202 can create a first service request message, a second service request message, and a third service request message. The processing computer 202 can then respectively transmit the first service request message, the second service request message, and the third service request message to the first server computer 204, the second server computer 206, and the third server computer 208. This can be performed in a non-serial manner. For example, the generation and the transmission of the first, second, and third service request messages can occur in parallel, without waiting for responses from other server computers. Each service request can comprise a transaction key and at least one data element of the data elements from the initial request message. The transaction key may be generated from one or more data elements in the initial request message in some embodiments.

As an illustration, the initial request message can be an authorization request message comprising data elements comprising a token, a verification value such as a CVV2, an expiration date, an access device identifier, an expiration date of the account number, a value (e.g., an amount), a timestamp, and other information. The first service request message can be a de-tokenization request message comprising at least the token. The second service request message can be the fraud determination request message comprising at least the token, the value, verification value, the access device identifier, and the timestamp. The third service request message can be a transaction alert request message which comprises at least the token, the access device identifier, the timestamp, and the value.

In step S208, the first server computer 204 can process the data elements of the first service request message, generate a first service response message comprising the transaction key and response data to the first service request message, and send the first service response message comprising response data back to the processing computer 202. For example, the first service request message can be a de-tokenization request message comprising at least the token. The first server computer 204 can look up a primary account number associated with the token, and the primary account number can be the response data. The time that took for the processing computer 202 to send the first service request message to the first server computer 204, and the time that it received the first service response message can be a first wait time period. The processing computer 202 can then save the first service response message and its response data in its database.

In step S210, the second server computer 206 can process the data elements of the second service request message, generate a second service response message comprising the transaction key and response data to the second service request message, and send the second service response message comprising response data back to the processing computer 202. For example, the second service request message can be a fraud determination request message comprising at least the token, the value, verification value, the access device identifier, and the timestamp. The second server computer 206 can use a fraud scoring algorithm to determine a fraud score using these data elements. The time that took for the processing computer 202 to send the second service request message to the second server computer 206, and the time that it received the second service response message can be a second wait time period. The processing computer 202 can then save the second service response message and its response data in its database.

In step S212, the third server computer 208 can process the data elements of the third service request message, generate a third service response message comprising the transaction key and response data to the third service request message, and send the third service response message comprising response data back to the processing computer 202. For example, the third service request message can be a transaction alert request message which comprises at least the token, the access device identifier, the timestamp, and the value. The third server computer 208 can obtain the user's phone number from a database that maps the token to the phone number, and can generate and send a transaction alert to the user informing the user that a transaction for the value and at the identified access device is now being conducted using the user's token. The third server computer 208 can generate response data after sending the transaction alert. The response data could be an indication that the transaction alert was successfully transmitted to the user, or that the user successfully responded to the transaction alert. The time that took for the processing computer 202 to send the first service request message to the third server computer 208, and the time that it received the third service response message can be a third wait time period. The processing computer 202 can then save the third service response message and its response data in its database.

Figure 3:
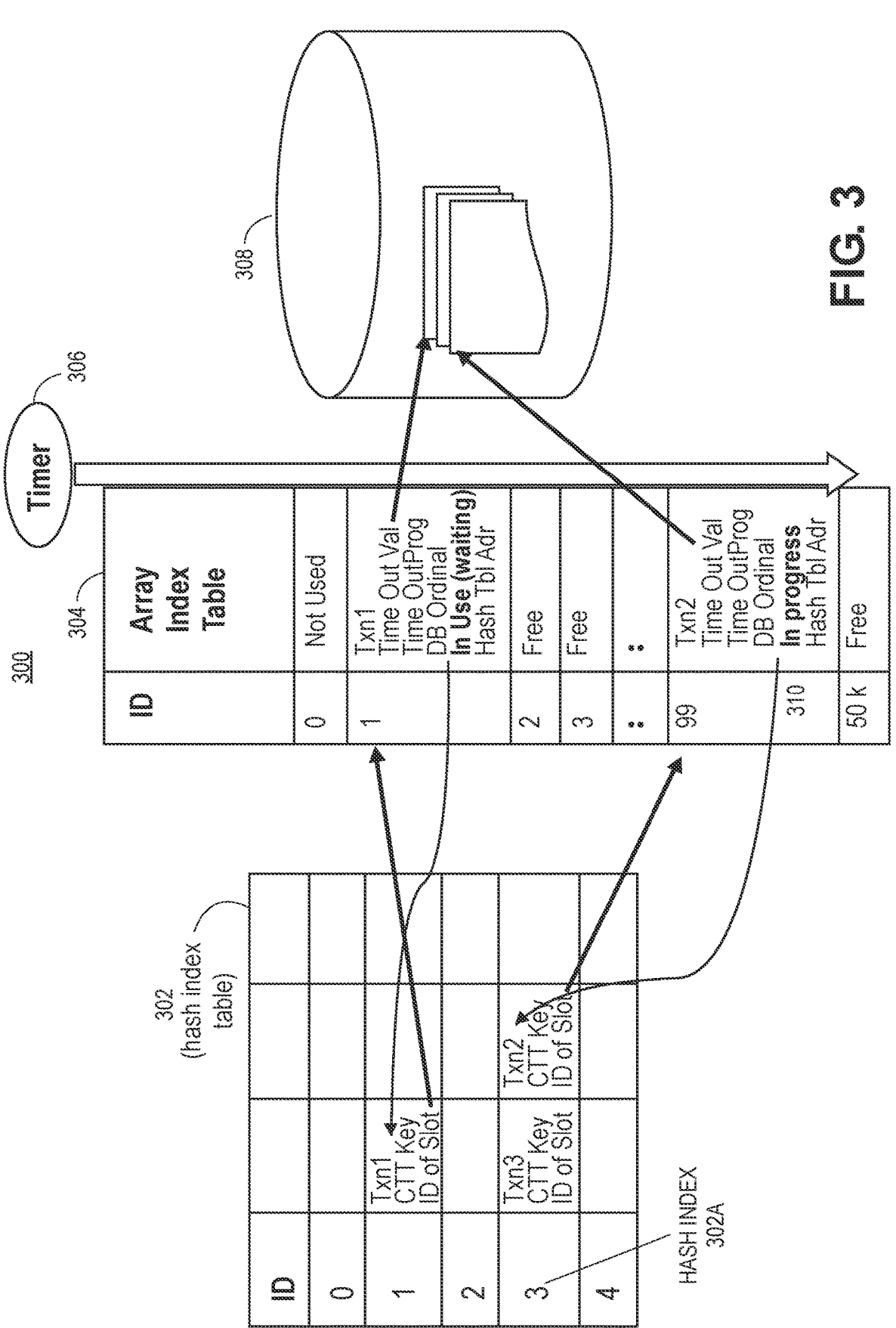
FIG. 3 shows a data access system including a hash index table, a timer, an array index table, and a database according to embodiments.

Each request message can have a different wait time to process the request. In FIG. 3, the first wait time is represented to have the shortest wait time, then the second wait time, and then the third wait time.

In step S214, the processing computer 202 can create a subsequent message after receiving all expected service response messages. The subsequent message can be a modified request message that is based on at least some of the information stored in the first, second, and third service response messages.

The subsequent message could be a reply message such as an authorization response message and is sent back to the access device 201 (see step S214A. The subsequent message could alternatively be a modified request message, which could be forwarded to another computer such as an authorizing entity computer (e.g., an issuer computer) for further processing (e.g., authorization).

The time period from the time starting from the receipt of the initial request message to the sending of the subsequent message can include at least the first wait time period, the second wait time period, and the third wait time period. This method of processing the initial request message can be faster than the prior method shown in FIG. 1, since the processing computer 102 does not need to wait to receive a service response message of one service request message before it transmits another service request message.

Figure 4B:
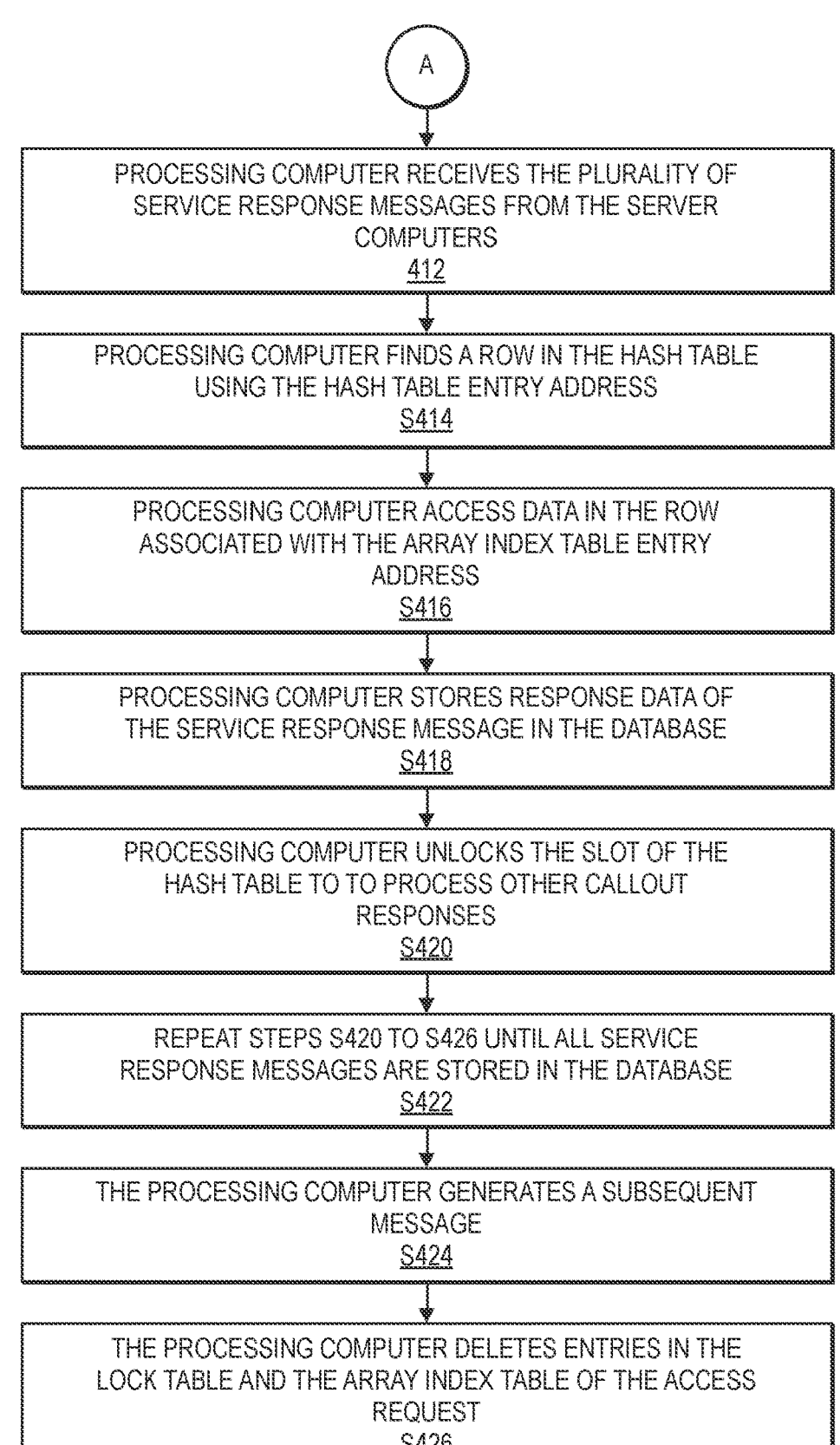

Further details to how the processing computer generates a service request message, how the processing computer processes the service response messages, and how the processing computer stores the service response messages can be shown in message flow diagrams of FIGS. 4A and 4B.

FIG. 3 shows a data access system of a processing computer including a hash index table 302, a timer 306, an array index table 304 and a database 308. The hash index table 302 can be referred to as a lock table, and can be a gateway to the array index table 304. The array index table 304 can have the data needed to process the service response messages, without including extra unnecessary data for processing the service response messages. The hash index table 302 and the array index table 304 can be stored in a memory such as random access memory (RAM) in the processing computer for fast access.

The database 308 can store extra information associated with the transaction. Such information would not be needed to manage service request messages (i.e., callouts) or service response messages (i.e., callout responses), but would be information that can be useful for subsequent processing of the transaction by the payment processing network or another entity such as an issuer. Such information might include the data that was in the authorization request message, a fraud score that was generated for the authorization request message, timestamps associated with the authorization request message, tokens received from external servers, etc.

Prior to transmitting callouts or service request messages to external servers, data from an initial request message can be saved. The initial request message can contain several data fields with data elements. Examples of data fields and data elements can include an account identifier data field for storing a PAN or token, an expiration date data field for storing an expiration date for the account identifier, a terminal ID data field for the terminal identifier for the access device used, a merchant ID data field for a merchant identifier, a CVM data field for a card verification method data field, an amount data field for an amount of the transaction, etc. A collection of at least some of these or other data fields may constitute a "CTT key", which is an example of a "transaction key." It can serve to identify the transaction being processed. In some embodiments, the transaction key can be hashed to create the hash index (e.g., "1", "2", "3" or "4" in the hash index table 302). The processing computer can also determine a row ID which corresponds to an empty row in the array index table 304 where the data needed to manage the service response messages will be stored.

The entries in the rows in the array index table 304 can include a transaction ID, a maximum time out value ("Time Out Val"), a timeout program ("Time Out Prog"), a database entry address ("DB Ordinal"), a status indicator (e.g., "In Progress," "In Use (waiting)"), and a hash index (e.g., "1", "2", "3", "4"). This data may be determined and saved after the initial request message is received. Each row in the array index table 304 can store data or instructions needed to process or manage the service request and response messages for an initial request message or a single transaction.

The maximum time out value can be a value that is a TOD or time of day that can be at the millisecond level. This value can be calculated when an initial request message such as an authorization request message is received by the processing computer. For example, the processing computer can expect it will receive service responses messages from first, second, and third server computers within 100, 200, and 300 milliseconds, respectively, of sending service request messages to those server computers. Thus, if the current time of data is 12:00 am, then the timeout time to receive service response messages after sending service request messages may be 12:00 am plus 300 milliseconds (i.e., maximum timeout value of the three authorization request messages).

The timeout program can be an internal executable module which is invoked when a service response message is not received. This module can ensure the continuity of transaction processing when no response is received. In some embodiments, the timeout program can manage building a subsequent message. The timeout program can make the processing computer wait extra time if an important service response message is not received. For example, if a de-tokenization response message is not received by the processing computer, then the timeout program can choose to wait for an extra amount of time in addition to the maximum timeout value as de-tokenization response message may be required before a subsequent message can be generated. The timeout program can also contain logic to continue with creation of a subsequent message or declining the transaction depending on the number of service response messages received.

The database entry address of "DB ordinal" can be a pointer to the database 308 where the details of the initial request message that are not in the hash index table 302 or the array index table 304 can be stored.

The status indicator may indicate a status of the authorization request message or the transaction. Four exemplary statuses include: 1) un-reserved, 2) reserved, 3) in progress, and 4) timed-out. Further details regarding these example statuses are provided below.

The timer 306 can be a single thread system used to execute the processing of the service responses after they are received. In some embodiments, if expected service responses are not received by the processing computer by the maximum time out value, then the processing computer can continue building the subsequent message (e.g., a modified authorization request message) without the response data that was expected but was not received. In some embodiments, the processing computer can terminate the processing of the initial request message if no service response messages were returned or if specific service response messages were not returned.

In some embodiments, processing computer may have the timer 306 that can check on the entries in the array index table 304 at various intervals (e.g., every 250 milliseconds). For example, every 250 milliseconds, the processing computer can look at each entry in the array index table 304 and determine if the current time is before or after the maximum timeout time in entry in the array index table 304. The processing computer may then take action (e.g., proceed or wait) depending upon whether the current time is before or after the maximum timeout time in the array index table 304.

After the data is saved in the hash index table 302, the array index table 304, and the database 308, the service request messages are sent to the server computers as described above. In some embodiments, the service request messages may each include the transaction key or the hash index. This information can be returned in the service response messages after the processing is completed by the server computers.

In some embodiments, service response messages (e.g., callout response message) can be processed after they are received. In an example, a service response message including the transaction key can be received by a processing computer from a first server computer. The transaction key can be hashed to form the hash index 302A. The processing computer can then identify the data associated with the transaction key and then look up the corresponding data in the array index table 304 using the row identifier ("ID of slot").

If the service response message is the last one that is expected for the transaction, the subsequent message (e.g., a modified request message) can be built by the processing computer using the information in the database 308. For instance, response data (e.g., a fraud score) of service response messages stored in the database 308 can be obtained and a modified request message (e.g., authorization request message) may be sent to an authorizing entity computer for authorization. Then, the corresponding entries in the array index table and the hash index table can be deleted to make room for other transactions. The processing computer can determine the service response message is the last one, if the processing computer determines that there are no other entries corresponding to that particular transaction in the array index table 304.

If the service response message is not the last one expected, then the "In progress" indicator may be present or re-affirmed in the array index table 304. Further, the processing computer and the timer 306 can scan through the array index table 304 to identify any transactions that should be timed out. For example, as indicated in the example above, if the timeout time is 12:00 am plus 600 milliseconds, and the current state of the timer is 12:00 am plus 605 milliseconds, then the processing computer could determine that the transaction has timed out and the data for the transaction can be deleted from the array index table 304. In some examples, a response can be sent back to the access device indicating that the initial request message failed. In other examples, the timeout program may indicate that the processing computer may wait for an extra amount of time before sending a time out message.

FIGS. 4A and 4B shows a message flow diagram of non-serial (e.g., parallel) call-out scheme. The message flow diagram may involve referencing the flow diagram of FIG. 2 and the data access system of FIG. 3.

In step S402, the access device 201 can send an initial request message to the processing computer 202 to process a transaction such as a payment transaction. The initial request message can comprise a plurality of data fields with data elements for the transaction. Examples of data fields and data elements can include an account identifier data field for storing a PAN or token, an expiration date data field for storing an expiration date for the account identifier, a terminal ID data field for the terminal identifier for the access device used, a merchant ID data field for a merchant identifier, a CVM data field for a card verification method data field, an amount data field for an amount of the transaction, etc. This step may be similar to step S201 of FIG. 2.

In step S404, upon receiving the initial request message, the processing computer 202 can create a plurality of service request messages (e.g., callout requests) associated with the initial request message. Each service request can comprise a transaction key and at least one data element of the data elements from the initial request message. Each service request message may be associated with the initial request message. For example, the plurality of service request messages can be a de-tokenization request message, a fraud determination message, a transaction alert request message, etc. This step may be similar to step S202 of FIG. 2.

In step S406, the processing computer 202 can store the data elements of the initial request message. The processing computer 202 can determine a row in the hash index table and the array index table to store data or instructions needed to process or manage the service request and response messages for the transaction. In some embodiments, the processing computer 202 can generate a transaction key that may include a collection of at least some of the data elements in the initial request message. For example, a transaction key may be the value of a token, a transaction value, and an expiration date concatenated together. The processing computer 202 can then hash the transaction key to determine a hash index, which may correspond to a row in the hash index table 302. The processing computer can store a transaction ID (newly created or previously received from the access device 201), the transaction key, and an array index table entry address in a cell associated with the hash index. As shown in FIG. 3, for hash index "3" data for two different transactions is present in two different cells in the row corresponding to the hash index "3."

The array index table entry address (e.g., "ID of Slot") can be a pointer to a row in the array index table 304. The array index table 304 stores data and/or instructions needed to process service request and response messages for the payment transaction. In some embodiments, the processing computer can store the transaction ID, a maximum time out value (i.e., maximum timeout value of the service request messages), a timeout program, a database entry address, a status indicator, and the hash index in the row associated with the array index table entry address. The other data elements of the initial request message not stored in the hash index table and the array index table, but are stored in the database at the database entry address (e.g., "DB Ordinal" in FIG. 3). Such data elements might include the data elements describe above including, but not limited to the access device identifier, the token, the name, expiration date, CVM, etc.

In step S408, once the plurality of service requests is generated and the data elements of the initial request message are stored in the database 308, the processing computer 202 can transmit the plurality of service request messages to the plurality of server computers 204, 206, 208. This is similar to steps S202, S204, and S206 of FIG. 2.

In step S410, the plurality of server computers 204, 206, 208 can process the data elements in the respective plurality of service request messages. The plurality of server computers 204, 206, 208 can then generate and transmit a plurality of service response messages to the processing computer 202 as described above with respect to steps S208, S210, and S212 of FIG. 2.

The processing computer 202 can assign different wait times for each server computer 204, 206, 208. The wait times are times that the processing computer 202 will wait for responses from the server computers 204, 206, 208, before taking further action. For example, a server computer that performs a fraud determination process may take longer than a server computer that performs a de-tokenization process, because the former process is more complicated than the latter process.

In step S412, the processing computer 202, upon receiving the plurality of service response messages, can process each server response message in the order it was received. For example, in FIG. 2, since a processing computer 202 received the first service request message first, the processing computer 202 will process the first service response message before other service response messages.

In step S414, when the processing computer processes a service response message among the plurality of service response messages, the processing computer can hash the transaction key of the service response message to determine the hash index. The processing computer can then use the hash index and the transaction key to find a matching cell in the hash index table. The processing computer can then access the data in the matching cell to obtain the array index table entry address (e.g., "ID of Slot" in FIG. 3). The processing computer 202 can use the array index table entry address to access the row associated with the array index table entry address. The processing computer 202 can lock a row in the hash index table associated the hash index once the processing computer obtains the array index table entry address.

In step S416, the processing computer 202 can then access the data in the row associated with the array index table entry address. At this point, the processing computer 202 can perform further processing using the data in the row. For example, the processing computer 202 can change the status to indicate that the service response messages are being processed (e.g., "In Use (Waiting)") and access the location associated with the database entry address (e.g., "DB ordinal" in FIG. 3) in the database 308.

In step S418, as part of the further processing, the processing computer 202 can store the response data in the row associated with the database entry address. For example, if the service response message was a detokenization response message with the response data being the primary account number, the processing computer can store the primary account number in the row associated with the database entry address.

The database 308 can have any suitable data structure. Since the database 308 stored data elements of the initial request message in the row associated with the database entry address (e.g., "DB Ordinal"), the processing computer 202 may move to the next open address to store the response data. For example, if database entry address has an address of x90000000, the processing computer may need to go to next available address of x90000100 to store response data of the service response message if the size of the data elements stored in the database entry address is 100 bytes.

In some embodiments, when the processing computer 202 processes the service response message, the processing computer 202 can lock the row associated with the hash index 302A in the hash index table 302 so that the processing computer 202 cannot process other service response messages while processing the current service response message. This is because the processing computer can write (store) response data for every service response message in the plurality of service response messages in the same (shared) memory. Every service response message in the plurality of response messages has the same transaction key, resulting in the same hash index, array index table entry address, and database entry address. Locking the row in the hash index table can prevent from shared memory conflict that might occur due to writing in the same (shared) memory.

For example, the processing computer may be a multithreaded computer with a data access system. The processing computer can receive a first service response message, in which a first thread of the processing computer can process the first service response message. While processing the first service response message, the processing computer can receive a second service response message, in which a second thread of the processing computer can process the second service response message. The first thread and the second thread may search for next open address at the same time, in which both found to be address x90000100. In such case, if both the first thread and the second thread write response data of their respective servicer response message in the same address x90000100, there is a memory conflict (as one response data can overwrite another response data).

In step S420, the processing computer can unlock the lock in the row of the hash index table 302 associated with the hash index 302A after it finishes storing the response data in the database 308 associated with the database entry address.

In step S422, once the row unlocks, other service response messages among the plurality of service response messages can be processed in the order they are received by the processing computer 202. The above steps can be repeated to process each service response message until all the plurality of service response messages associated with a transaction are processed.

In step S424, all service response messages are received within their expected times, the processing computer 202 can retrieve any response data from the plurality of service response messages and any data elements of the initial request message stored in the database entry address of the database. The processing computer 202 can then generate a subsequent message such as a modified authorization request message. If some or all service responses messages are not received within the expected times, then the processing computer 202 could continue with the processing of the subsequent message or can indicate to the access device 201 that the request failed.

In step S426, the processing computer can delete entries associated with the initial request message in the hash index table and the array index table.

Figure 5:
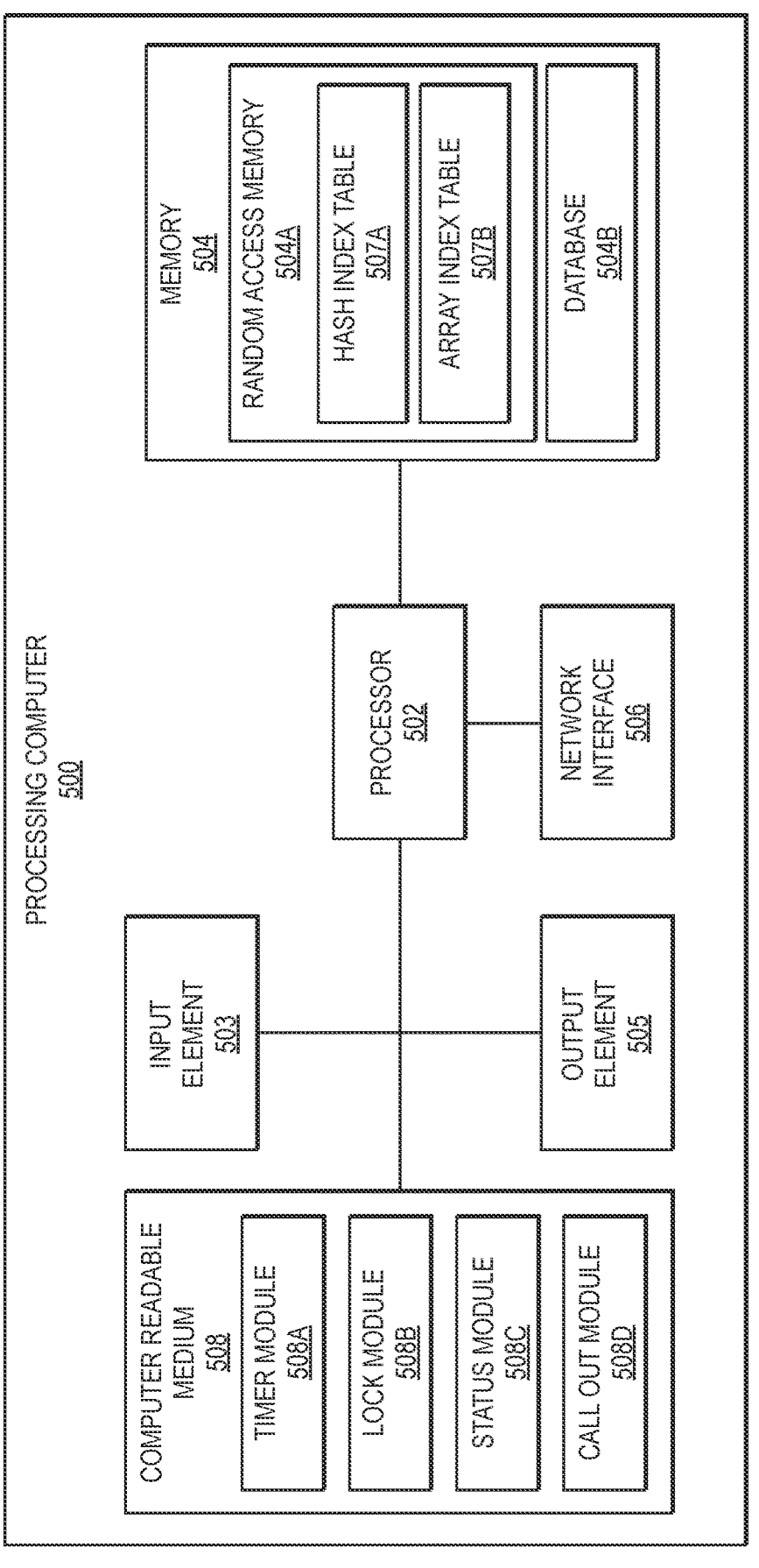
FIG. 5 shows a block diagram of a processing computer according to embodiments.

FIG. 5 shows a block diagram of a processing computer 500 according to embodiments. The processing computer 500 may comprise a processor 502. The processor 502 may be coupled to an input element 503, an output element 505, a memory 504, a network interface 506, and a computer readable medium 508. The computer readable medium 508 may comprise any suitable number and types of software modules.

Examples of input elements may include microphones, keypads, touchscreens, sensors, etc. Examples of output elements may include speakers, display screens, and tactile devices. The processor 502 can be implemented as one or more integrated circuits (e.g., one or more single core or multicore microprocessors and/or microcontrollers) and can be used to control the operation of the processing computer 500. The processor 502 can execute a variety of programs in response to program code or computer-readable code and can maintain multiple concurrently executing programs or processes The memory 504 may be used to store data and code. The memory 504 may be coupled to the processor 502 internally or externally (e.g., via cloud-based data storage), and may comprise any combination of volatile and/or non-volatile memory such as RAM, DRAM, ROM, flash, or any other suitable memory device. The memory 504 may comprise a random access memory 504A and a database 504B.

The random access memory 504A can be an example of a volatile memory and can store a hash index table 507A and an array index table 507B. The hash index table 507A can be used to store a transaction ID, transaction key, and an array index entry identifier of a transaction. The array index table 507B can store the transaction ID, a maximum time out value, a timeout program, a database entry address, a status indicator, and a hash index of a transaction. Both the hash index table 507A and the array index table 507B can store information that are needed to manage service request messages or service response messages of the transaction.

The database 504B can be on an SSD or a hard drive that can store extra information associated with the transaction not needed to manage callouts (i.e., service request messages) or callout responses (i.e., service response messages), but would be information that can be useful for subsequent processing of a transaction (e.g., such as by a payment processing network or another entity such as an issuer). Such information might include the data that was in the authorization request message, a fraud score that was generated for the authorization request message, timestamps associated with the authorization request message, tokens received from external servers, etc.

The network interface 506 may include an interface that can allow the processing computer 500 to communicate with external computers. The network interface 506 may enable the processing computer 500 to communicate data to and from another device such as an access device, server computers, etc. Some examples of the network interface 506 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 506 may include Wi-Fi™. Data transferred via the network interface 506 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 506 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 508 may comprise code, executable by the processor 502, for a method using a processing computer 500 comprising a memory 504 comprising a hash index table 507A and an array index table 507B, the method comprising: receiving, by the processing computer, an initial request message comprising a plurality of data fields with data elements for a transaction; creating, by the processing computer, a plurality of service request messages associated with the initial request message, wherein each service request message comprises a transaction key and at least one data element of the data elements; transmitting, by the processing computer, the plurality of service request messages to a plurality of server computers, wherein the plurality of server computers process the data elements in the respective plurality of service request messages, and generate a plurality of service response messages, each service response message comprising the transaction key and response data; receiving, by the processing computer, the plurality of service response messages from the plurality of server computers; and for each of the plurality of service response messages: accessing, by the processing computer, the hash index table and determining a row address identifier for a row in the hash index table based on the transaction key; and accessing, by the processing computer, data in the row of the hash index table associated with the row address identifier and performing further processing using the data in the row in the hash index table The computer readable medium 508 may comprise several software modules including, but not limited to, a timer module 508A, a lock module 508B, a status module 508C, and a call out module 508D.

The timer module 508A may be used to check on the maximum time out values of a transaction stored in the array index table 507B. A maximum timeout value of the transaction can be a maximum amount of time that the processing computer 500 can wait on the service response messages for the transaction. In some embodiments, the timer module 508A detects that the current time exceeds the maximum time out value of the transaction, then the timer module 508A can trigger the processing computer to continue the transaction even if the transaction didn't receive all the service response messages. The timer module 508A can check on the maximum time out values of the transaction at certain periods. For example, the timer module 508A can check on the maximum time out values every 250 ms.

The lock module 508B can be responsible for locking a row in the hash index table 507A associated with a transaction when processing a service response message for the transaction. Since there can be many service response messages and they all share the same memory, there can be a memory conflict when processing multiple service response messages at the same time by the processing computer 500. The lock module can lock and unlock the rows in the hash index table 507A of the transaction to avoid memory conflict.

The status module 508C can oversee changing the status of a row of the array index table 507B. For example, there can be four statuses in embodiments: 1) unreserved, 2) reserved, 3) in progress, and 4) timed-out. The unreserved status can indicate that the current row is empty and available for use. Therefore, any transactions can be stored in the unreserved row. The reserved status can indicate that the current row is occupied and reserved. This can indicate that the current transaction is locked, and a service response message is being processed by the processing computer. The in-progress can indicate that there is no service response being processed by the processing computer currently, but there are still some service responses that the processing computer is waiting to process. In some embodiments, the in-progress status can be indicated as "In Use (waiting)". The timed-out status can indicate that the current row is timed-out. If the transaction associated with the current row is timed out, then the timer module 508A can delete the data related to the transaction including cell in the hash table, the row in the array index table, etc.

Figure 6:
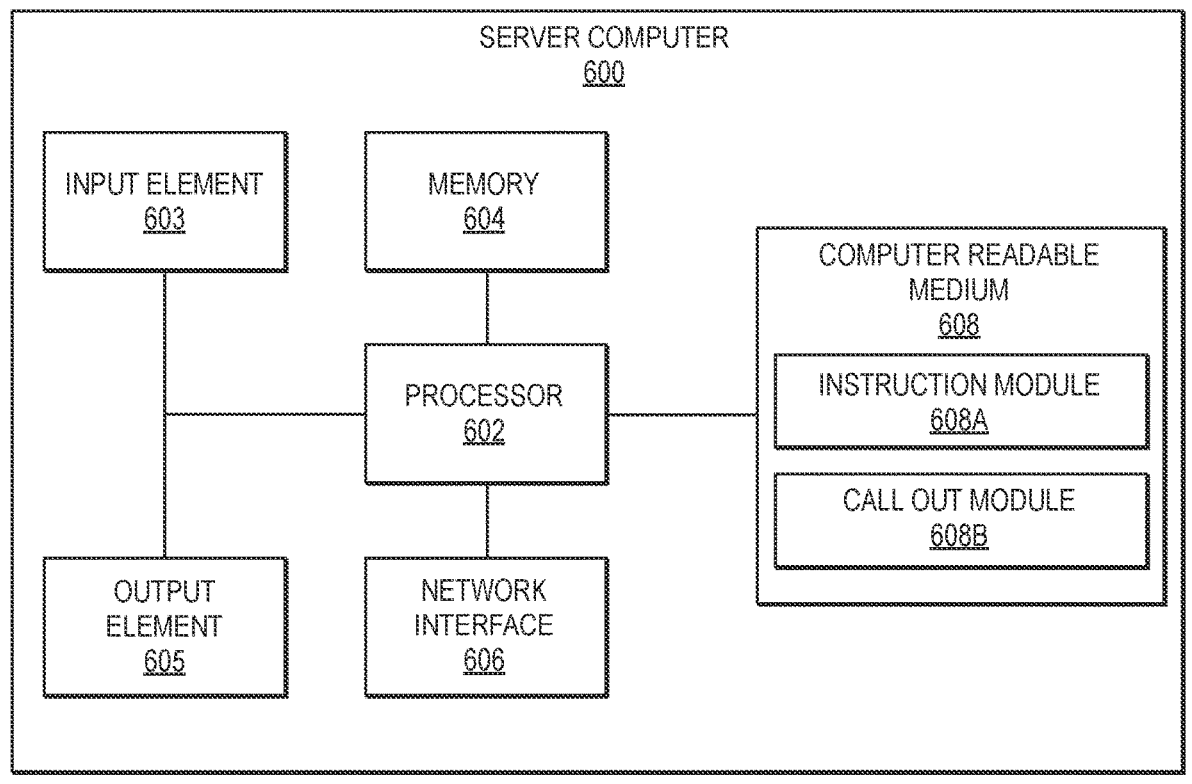
FIG. 6 shows a block diagram of a server computer according to embodiments.

FIG. 6 shows a block diagram of a server computer 600 according to embodiments. The server computer 600 may comprise a processor 602. The processor 602 may be coupled to an input element 603, an output element 605, a memory 604, a network interface 606, and a computer readable medium 608. The computer readable medium 608 may comprise any suitable number and types of software modules.

Examples of input elements may include microphones, keypads, touchscreens, sensors, etc. Examples of output elements may include speakers, display screens, and tactile devices. The processor 602 can be implemented as one or more integrated circuits (e.g., one or more single core or multicore microprocessors and/or microcontrollers) and can be used to control the operation of the server computer 600. The processor 602 can execute a variety of programs in response to program code or computer-readable code and can maintain multiple concurrently executing programs or processes The memory 604 may be used to store data and code. The memory 604 may be coupled to the processor 602 internally or externally (e.g., via cloud-based data storage), and may comprise any combination of volatile and/or non-volatile memory such as RAM, DRAM, ROM, flash, or any other suitable memory device.

The network interface 606 may include an interface that can allow the server computer 600 to communicate with external computers. The network interface 606 may enable the server computer 600 to communicate data to and from another device such as a processing computer, other server computers, etc. Some examples of the network interface 606 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 606 may include Wi-Fi™. Data transferred via the network interface 606 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 606 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

The computer readable medium 608 may comprise several software modules including, but not limited to, an instruction module 608A, and a call out module 608B.

The instruction module 608A may process the service request messages received by the server computer 600. For example, if a service request message is de-tokenization request message, then the instruction module 608A can perform de-tokenization of the token to access a primary account number stored in its memory 604. The call out module 608B may use the data obtained by processing the service request message and build a service response message. For example, obtaining the primary account number, the call out module 608B can build a service response message comprising the primary account number and other data in the service request message.

Embodiments of the invention have a number of advantages. One advantage of the invention is because minimal data is present in the array index table which is in a memory such as RAM, the array index table can be searched quickly to process service response messages from external servers, while efficiently managing the storage of data in the memory such as RAM. Another advantage of the invention is that the service request messages can now be sent in parallel as opposed to sending one service request message only after receiving a service response message of another service request message. This makes the maximum total wait time of processing the service request messages to be a maximum timeout value of service request messages instead of addition of timeout value of each service response message, drastically shortening the time to build an authorization request message.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention may become apparent to those skilled in the art upon review of the disclosure. The scope of the invention can, therefore, be determined not with reference to the above description, but instead can be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method using a processing computer comprising a memory comprising a hash index table and an array index table, the method comprising:

receiving, by the processing computer, an initial request message comprising a plurality of data fields with data elements for a transaction;

creating, by the processing computer, a plurality of service request messages associated with the initial request message, wherein each service request message comprises a transaction key and at least one data element of the data elements;

transmitting, by the processing computer, the plurality of service request messages to a plurality of server computers, wherein the plurality of server computers process the data elements in the respective plurality of service request messages, and generate a plurality of service response messages, each service response message comprising the transaction key and response data;

receiving, by the processing computer, the plurality of service response messages from the plurality of server computers; and for each of the plurality of service response messages:

accessing, by the processing computer, the hash index table and determining a row address identifier for a row in the array index table based on the transaction key; and accessing, by the processing computer, data in the row of the array index table associated with the row address identifier and performing further processing using the data in the row in the array index table, and wherein for each of the plurality of service response messages, the method further comprises:

locking, by the processing computer, a row in the hash index table based on a hash index after the processing computer determines the row address identifier; and unlocking, by the processing computer, the row in the hash index table based on the hash index after performing the further processing using the data in the row in the array index table, and wherein the method further comprises:

creating, by the processing computer, the transaction key for the transaction;

saving, by the processing computer, the transaction key along with the row address identifier for the row in the array index table and a transaction ID in a location in the hash index table;

saving, by the processing computer, the data including a time out value, a timeout program, a callout status, the transaction ID, a hash index, and a database entry address of a database in the row of the array index table; and saving, by the processing computer, the data elements in the database at the database entry address.

2. The method of claim 1, wherein the transaction key comprises at least some of the data elements from the data fields in the initial request message.

3. The method of claim 1, wherein for each of the plurality of service response messages, the method further comprises:

determining, by the processing computer, a hash index by hashing the transaction key; and accessing, by the processing computer, data in a cell of the hash index table based on the hash index and the transaction key.

4. The method of claim 1, further comprising:

generating, by the processing computer, a modified request message based on the response data of the plurality of service response messages; and forwarding, by the processing computer, the modified request message to an authorizing entity computer for authorization.

5. The method of claim 1, wherein the initial request message is an authorization request message and performing further processing includes using a timer to determine if the transaction has timed out.

6. The method of claim 1, wherein the processing computer has a plurality of timeout values for the plurality of service response messages and a maximum timeout value.

7. The method of claim 6, wherein the maximum timeout value is a longest timeout value among the plurality of timeout values for the plurality of service response messages.

8. The method of claim 6, further comprising:

generating, by the processing computer, a modified request message only with the response data of the service response messages among the plurality of service response messages that did not exceed the maximum timeout value; and forwarding, by the processing computer, the modified request message to an authorizing entity computer for authorization.

9. The method of claim 6, wherein the processing computer terminates the transaction if none of the service response messages are received before the maximum timeout value.

10. The method of claim 1, further comprising:

deleting, by the processing computer, data in a cell in the hash index table associated with the hash index and the transaction key; and deleting, by the processing computer, data in the row in the array index table associated with the row address identifier.

11. The method of claim 10, further comprising:

deleting, by the processing computer, data stored in the database entry address of the database.

12. The method of claim 1, wherein the hash index table and the array index table are stored in random access memory (RAM).

13. The method of claim 1, wherein the initial request message is an authorization request message comprising a token and an expiration date.

14. The method of claim 1, wherein the initial request message is received from an access device.

15. The method of claim 1, wherein the initial request message is an authorization request message for a payment transaction, and is from an access device.

16. The method of claim 15, wherein the method further comprises:

transmitting, by the processing computer, an authorization response message to the access device.

17. A method using a processing computer comprising a memory comprising a hash index table and an array index table, the method comprising:

receiving, by the processing computer, an initial request message comprising a plurality of data fields with data elements for a transaction;

creating, by the processing computer, a plurality of service request messages associated with the initial request message, wherein each service request message comprises a transaction key and at least one data element of the data elements;

transmitting, by the processing computer, the plurality of service request messages to a plurality of server computers, wherein the plurality of server computers process the data elements in the respective plurality of service request messages, and generate a plurality of service response messages, each service response message comprising the transaction key and response data;

receiving, by the processing computer, the plurality of service response messages from the plurality of server computers; and for each of the plurality of service response messages:

accessing, by the processing computer, the hash index table and determining a row address identifier for a row in the array index table based on the transaction key; and accessing, by the processing computer, data in the row of the array index table associated with the row address identifier and performing further processing using the data in the row in the array index table, and wherein for each of the plurality of service response messages, the method further comprises:

locking, by the processing computer, a row in the hash index table based on a hash index after the processing computer determines the row address identifier; and unlocking, by the processing computer, the row in the hash index table based on the hash index after performing the further processing using the data in the row in the array index table, and wherein for each of the plurality of service response messages, the method further comprises:

obtaining, by the processing computer, a database entry address, a callout status, and a timeout program by using the data in the row of the array index table associated with the row address identifier;

updating, by the processing computer, the callout status;

accessing, by the processing computer, a row of a database associated with the database entry address; and storing, by the processing computer, the response data of the service response message in the row of the database associated with the database entry address.

18. A processing computer comprising:

a processor;

a memory comprising a hash index table and an array index table; and a computer readable medium coupled to the process, the computer readable medium comprising code executable by the processor for performing operations comprising:

receiving an initial request message comprising a plurality of data fields with data elements for a transaction;

creating a plurality of service request messages associated with the initial request message, wherein each service request message comprises a transaction key and at least one data element of the data elements;

transmitting the plurality of service request messages to a plurality of server computers, wherein the plurality of server computers process the data elements in the respective plurality of service request messages, and generate a plurality of service response messages, each service response message comprising the transaction key and response data;

receiving the plurality of service response messages from the plurality of server computers; and for each of the plurality of service response messages:

accessing the hash index table and determining a row address identifier for a row in the array index table based on the transaction key; and accessing data in the row of the array index table associated with the row address identifier and performing further processing using the data in the row in the array index table, and wherein for each of the plurality of service response messages, the operations further comprise:

locking, by the processing computer, a row in the hash index table based on a hash index after the processing computer determines the row address identifier; and unlocking, by the processing computer, the row in the hash index table based on the hash index after performing the further processing using the data in the row in the array index table, and wherein the operations further comprise:

creating, by the processing computer, the transaction key for the transaction;

saving, by the processing computer, the transaction key along with the row address identifier for the row in the array index table and a transaction ID in a location in the hash index table;

saving, by the processing computer, the data including a time out value, a timeout program, a callout status, the transaction ID, a hash index, and a database entry address of a database in the row of the array index table; and saving, by the processing computer, the data elements in the database at the database entry address.

19. The processing computer of claim 18, wherein the operations further comprise, generating a subsequent message after receiving the plurality of service response messages.

20. The processing computer of claim 18, wherein the plurality of server computers perform de-tokenization processing, data security processing, and alert processing, respectively.

* * * * *